(12) United States Patent  
Topmiller (10) Patent No.: US 8,893,556 B2
(45) Date of Patent: Nov. 25, 2014

(54) PRESSURE SENSOR

(71) Applicant: Transducers Direct LLC, Cincinnati, OH (US)

(72) Inventor: David Allen Topmiller, Edgewood, KY (US)

(73) Assignee: Transducers Direct LLC, Cincinnati, OH (US)

( * ) Notice: Subject to any disclaimer, the term of this patent is extended or adjusted under 35 U.S.C. 154(b) by 208 days.

(21) Appl. No.: 13/742,047

(22) Filed: Jan. 15, 2013

(65) Prior Publication Data

US 2014/0196546 A1   Jul. 17, 2014

(51) Int. Cl.
    G01L 9/06   (2006.01)
(52) U.S. Cl.
    CPC ........................................ *G01L 9/06* (2013.01)
    USPC ............................................................ 73/721
(58) Field of Classification Search
    None
    See application file for complete search history.

(56) References Cited

U.S. PATENT DOCUMENTS

| 7,526,962 | B1 * | 5/2009 | Kurtz et al. | 73/721 |
| 2007/0151348 | A1 * | 7/2007 | Zdeblick et al. | 73/708 |
| 2012/0278009 | A1 | 11/2012 | Matthes et al. | |

OTHER PUBLICATIONS

Acam GmbH, PS021 Datasheet.
Acam GmbH, PS08 Datasheet.
Acam GmbH, PS081 Datasheet.
Acam GmbH, PS09 Datasheet.

* cited by examiner

*Primary Examiner* — Lisa Caputo
*Assistant Examiner* — Brandi N Hopkins
(74) *Attorney, Agent, or Firm* — David A. Topmiller, Esq.

(57) ABSTRACT

A pressure sensor is claimed for measuring the pressure of a fluid. The pressure sensor comprises two or more half bridges, an analog-to-digital converter, a microcontroller, an output generator, and one or more redundancy circuits. Each half bridge comprises two resistive pressure sensing elements (RSPE) electrically coupled to the analog-to-digital converter. Each redundancy circuit comprises a switch and resistor electrically in series. A redundancy circuit may be disposed electrically in parallel with any or all of the RSPEs of the half bridges such that when an RSPE fails open, its corresponding redundancy circuit may be activated in order to permit the resistor of the redundancy circuit to take the place of the RSPE. This permits the analog-to-digital converter to continue to operate normally, even with a failed RSPE. The pressure sensor may then base its calculated pressure on the remaining half bridges which do not have a failed RSPE.

20 Claims, 5 Drawing Sheets

PRESSURE SENSOR

TECHNICAL FIELD

The present disclosure generally relates to pressure sensors and, in particular, to pressure sensors with two or more half bridges.

BACKGROUND

As background, pressure sensors are electronic transducers which measure the pressure of a fluid and convert said measurement into one or more corresponding electrical output signals. The one or more electrical output signals produced by the pressure sensor may comprise, inter alia, an analog voltage (e.g., 0 to 10 Volts), an analog current (e.g., 4 to 20 mA), one or more bus system signals (e.g., CANopen or HART protocol), or a wireless signal (e.g., ZigBee, Bluetooth, or WirelessHART). Other types of electrical output signals may be produced as well, as is known in the art.

Pressure sensors may comprise one or more half bridges which may be used to measure the pressure of the fluid. In one embodiment, a pressure sensor may comprise two half bridges. A half bridge may comprise two resistors mechanically coupled to the fluid. The resistance value of each resistor of the half bridge may change when the pressure of the fluid changes. Such a resistor may be called resistive pressure sensing element, or RPSE for short. The pressure sensor may measure the resistance of each RSPE in the one or more half bridges in order to determine the pressure of the fluid.

In some pressure sensor applications, it may be possible for at least one of the RSPEs of the one or more half bridges to malfunction. Such malfunctions may occur, for example, due to excessive vibration, extreme shock, or operation of the pressure sensor outside its permitted operating parameters. In these cases, prior art pressure sensors may not be capable of measuring the pressure of the fluid and may fail to produce an electrical output signal corresponding to the pressure of the fluid. The embodiments described herein include apparatuses and methods to permit a pressure sensor to produce an electrical output signal corresponding to the pressure of the fluid, even if one or more of its RSPEs malfunction.

SUMMARY

A pressure sensor is disclosed for measuring the pressure of a fluid, the pressure sensor comprising two or more half bridges, an analog-to-digital converter, a microcontroller, an output generator, and one or more redundancy circuits. The two or more half bridges are mechanically coupled to the fluid. Each of the two or more half bridges comprise a first resistive pressure sensing element (RPSE) and a second RPSE, such that the resistance of the first RPSE increases when the pressure of the fluid increases, and the resistance of the second RPSE decreases when the pressure of the fluid increases. The analog-to-digital converter is electrically coupled to the two or more half bridges and is operable to measure the resistance of the first and second RPSEs of the two or more half bridges such that the analog-to-digital converter is operable to produce a first digital number corresponding to the pressure of the fluid based on the measured resistance of the first and second RPSEs of at least one of the two or more half bridges. The microcontroller is electrically coupled to the analog-to-digital converter and the output generator, such that the microcontroller is operable to read the first digital number from the analog-to-digital converter, generate a second digital number corresponding to the pressure of the fluid, and write the second digital number to the output generator. The output generator is operable to receive the second digital number from the microcontroller and produce an electrical output signal based on the second digital number such that the electrical output signal corresponds to the pressure of the fluid. And the one or more redundancy circuits are electrically coupled to the one or more of the first RPSEs or one or more of the second RPSEs of the two or more half bridges, and the redundancy circuit comprises a resistor and a switch in series, wherein: the switch is electrically coupled to the microcontroller and comprises an open position and a closed position such that the microcontroller determines whether the switch is in the open position or the closed position, and when the switch is in the open position, the resistor has little or no effect on the resistance of the one or more first RPSEs or the one or more second RPSEs with which the redundancy circuit is electrically in parallel; and when the switch is in the closed position, the resistor is electrically in parallel with the one or more first RPSEs or the one or more second RPSEs with which the redundancy circuit is electrically in parallel.

A method is disclosed for operating a pressure sensor for measuring the pressure of a fluid, wherein the pressure sensor comprises two or more half bridges, an analog-to-digital converter, a microcontroller, an output generator, and one or more redundancy circuits. The two or more half bridges are mechanically coupled to the fluid. Each of the two or more half bridges comprise a first resistive pressure sensing element (RPSE) and a second RPSE, such that the resistance of the first RPSE increases when the pressure of the fluid increases, and the resistance of the second RPSE decreases when the pressure of the fluid increases. The analog-to-digital converter is electrically coupled to the two or more half bridges and is operable to measure the resistance of the first and second RPSEs of the two or more half bridges such that the analog-to-digital converter is operable to produce a first digital number corresponding to the pressure of the fluid based on the measured resistance of the first and second RPSEs of at least one of the two or more half bridges. The microcontroller is electrically coupled to the analog-to-digital converter and the output generator, such that the microcontroller is operable to read the first digital number from the analog-to-digital converter, generate a second digital number corresponding to the pressure of the fluid, and write the second digital number to the output generator. The output generator is operable to receive the second digital number from the microcontroller and produce an electrical output signal based on the second digital number such that the electrical output signal corresponds to the pressure of the fluid. And the one or more redundancy circuits are electrically coupled to the one or more of the first RPSEs or one or more of the second RPSEs of the two or more half bridges, and the redundancy circuit comprises a resistor and a switch in series, wherein: the switch is electrically coupled to the microcontroller and comprises an open position and a closed position such that the microcontroller determines whether the switch is in the open position or the closed position, and when the switch is in the open position, the resistor has little or no effect on the resistance of the one or more first RPSEs or the one or more second RPSEs with which the redundancy circuit is electrically in parallel; and when the switch is in the closed position, the resistor is electrically in parallel with the one or more first RPSEs or the one or more second RPSEs with which the redundancy circuit is electrically in parallel. The method comprises: determining that one or more of the first or second RPSEs has malfunctioned; setting to the closed position the switch of the redundancy circuit electrically in parallel with the malfunctioned first or second RPSE; and basing the measured pressure on the resistance of the one or more half bridges which do not have a malfunctioned first or second RPSE.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

This disclosure generally relates to pressure sensors comprising two or more half bridges. For the purposes of this disclosure, a "half bridge" is defined as two or more resistive pressure sensing elements (RSPEs) which are mechanically coupled to a fluid and whose electrical resistance values change when the pressure of the fluid changes. In one embodiment, a pressure sensor comprises two half bridges, each of which comprises two RSPEs. In one embodiment of a half bridge, the resistance of one RSPE may increase when the pressure of the fluid increases; and the resistance of the other RSPE may decrease when the pressure of the fluid increases. The pressure sensor may measure the resistance of the RSPEs of each half bridge and may determine the pressure of the fluid based on such measurements. Also, the pressure sensor may produce an electrical output signal which corresponds to the measured pressure of the fluid. The pressure sensors described herein may be capable of measuring the pressure of the fluid even if one or more of the RSPEs of its two or more half bridges malfunction.

For the purposes of this disclosure, a "fluid" is defined as any material or substance which is capable of continuously deforming in the presence of an applied force and may include gases, liquids, plasmas, plastic solids, and any combination thereof. Examples of fluids include but are not limited to air, nitrogen, oxygen, carbon dioxide, natural gas, ammonia, hydraulic fluid, water, and molten plastic. Fluids may include both gaseous and liquid materials at the same time and may also comprise one or more different kinds of materials such as, for example, nitrogen and oxygen.

The pressure of the fluid may be measured in pounds per square inch (psi), bar, Pascals (Pa), kiloPascals (kPa), megaPascals (MPa), or any other suitable unit of measurement. Furthermore, the pressure of the fluid may be measured with respect to a perfect vacuum (called "absolute measurement") or with respect to the ambient atmospheric pressure (called "relative measurement"). For the purposes of this specification, any reference to a pressure measurement assumes an absolute and/or a relative pressure measurement, unless otherwise specified.

Figure 1:
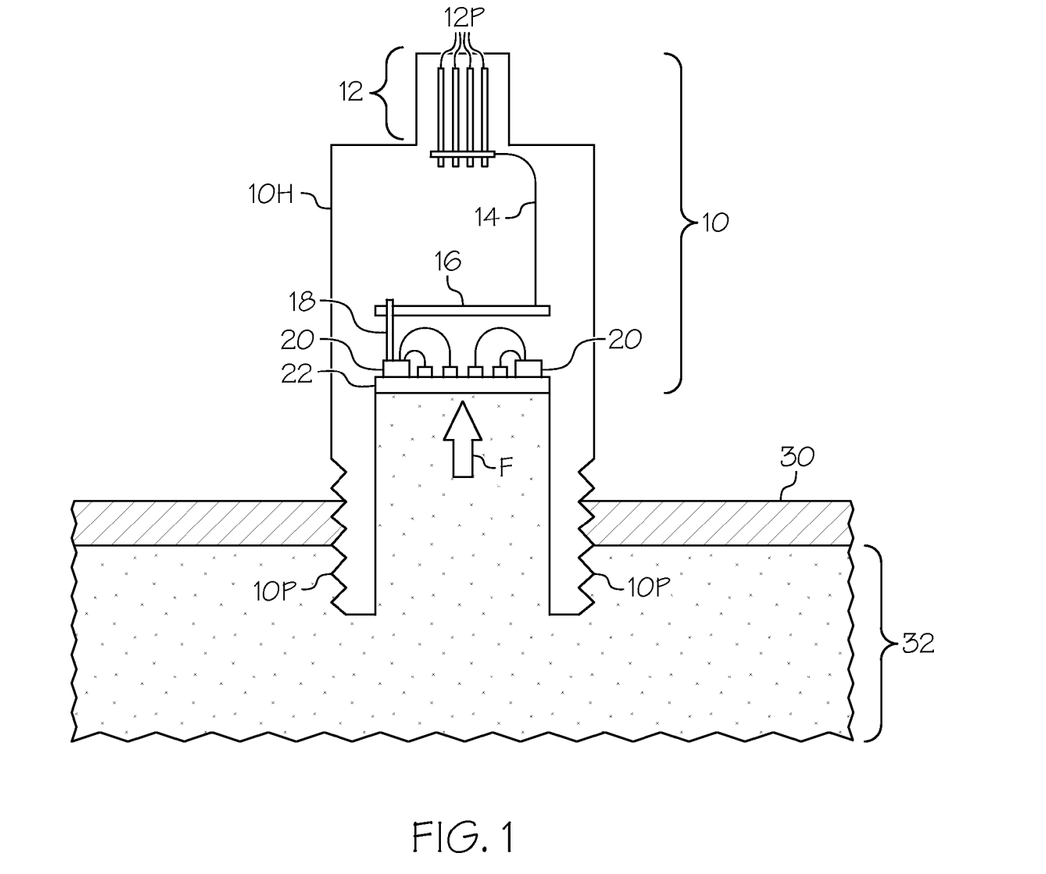
FIG. 1 depicts a side view of pressure sensor according to one or more embodiments shown and described herein.

FIG. 1 depicts a side view pressure sensor 10 according to one or more embodiments shown and described herein. The pressure sensor 10 may be operable to measure the pressure of a fluid 32. The pressure sensor 10 may be mounted in a wall 30 of a vessel containing the fluid 32 such as, for example, a tank, a manifold, a hydraulic line, a pneumatic line, a hydraulic cylinder, or a pneumatic cylinder. The pressure sensor 10 may be operable to measure the relative and/or the absolute pressure of the fluid 32.

The pressure sensor 10 may comprise an electrical connector 12 which may comprise two or more pins 12P. The connector 12 may permit the pressure sensor 10 to be electrically connected to external devices, such as computers, programmable logic controllers, and industrial controllers. The connector 12 may, in one embodiment, have four pins 12P. The connector 12 may permit a power source (e.g., a power supply) to supply power to the pressure sensor 10; for example, a 24-Volt power supply may supply power for the pressure sensor 10 to operate via a power pin and a ground pin. In addition, the connector 12 may permit the pressure sensor 10 to transmit an electrical output signal which corresponds to the measured pressure. As an example, the connector 12 may have two pins 12P which permit the pressure sensor 10 to transmit an analog voltage or analog current which corresponds to the measured pressure of the fluid. Generally, the pins 12P may be used for many different types of electrical output signals. In addition to analog voltage or analog current, the electrical output signal may comprise a digital signal such as digital voltage, or it may comprise one or more bus system signals such as CANopen and DeviceNet. The connector 12 may comprise any type of suitable electrical connector, including but not limited to M12 connectors, M8 connectors, and DIN connectors.

In other embodiments, the connector 12 and its associated pins 12P may be omitted from the pressure sensor 10. In these embodiments, the pressure sensor 10 may wirelessly transmit an electrical output signal (not shown) corresponding to the pressure of the fluid 32, wherein the electrical output signal comprises a wireless electromagnetic signal which may be received by a wireless receiver. Any suitable wireless protocol may be used including, for example, Bluetooth, wirelessHART, Zigbee, and Wi-Fi. An antenna (not shown) may be used by the pressure sensor 10 to facilitate the transmission of the wireless electromagnetic signal. In these embodiments, the power necessary to operate the pressure sensor 10 may be supplied by one or more batteries (not shown) inside the pressure sensor 10 or by any other suitable method. In addition, the pressure sensor 10 may acquire power through energy harvesting of light, vibrations, or electromagnetic waves.

The pressure sensor 10 may comprise a housing 10H which may house and protect the main components of the pressure sensor 10. The housing 10H may be generally cylindrical or may be of any suitable shape. The housing 10H may be comprised of stainless steel, aluminum, plastic, or other suitable material. In one embodiment, the housing 10H may be 316 stainless steel. The pressure sensor 10 may comprise a pressure port 10P which may permit the pressure sensor 10 to be installed in the wall 30 of a vessel containing the fluid 32 whose pressure is to be measured. Although FIG. 1 only depicts male threads on the pressure port 10P, it is contemplated that either male or female threads may be used. In one embodiment, the pressure port 10P may comprise ¼-inch NPT (national pipe thread) male threads. Other suitable ports may be used, like 7/16-inch-20 male threads. Furthermore, non-threaded pressure ports may be used as well such as quick-disconnect ports.

Continuing to refer to FIG. 1, the pressure sensor 10 may also comprise a cable 14 which electrically connects the pins 12P of the connector 12 to a main printed circuit board 16, hereinafter "main PCB 16." The cable 14 may be a ribbon cable, flat flexible cable, discrete wires, or any other suitable connection device. The cable 14 may permit the electrical signals to and from the connector 12 to be conveyed to the main PCB 16. Although only one main PCB 16 is shown in FIG. 1, it is to be understood that the main PCB 16 may actually comprise one or more printed circuit boards, as is known in the art. The main PCB 16 may comprise electrical components which facilitate the operation of the pressure sensor 10, as described below. The main PCB 16 may be of the flexible type or the rigid type. In addition, the main PCB 16 may be disposed in the housing 10H in any suitable manner and orientation.

The main PCB 16 may be electrically connected to a diaphragm printed circuit board 20, hereinafter "diaphragm PCB 20," which may be electrically coupled to the one or more half bridges. The half bridges may be mechanically coupled to a diaphragm 22 which is mechanically coupled to the fluid 32. Thus, the half bridges may be mechanically coupled to the fluid via the diaphragm 22. The half bridges and diaphragm 22 are shown in more detail in FIG. 2 and are described in more detail below.

Continuing to refer to FIG. 1, the diaphragm PCB 20 may be connected to the main PCB 16 via one or more standoffs 18. These standoffs 18 may comprise one or more electrical conductors which permit the main PCB 16 to be electrically coupled to the half bridges. The standoffs 18 may also provide mechanical support for the PCB 16. In one embodiment, the pressure sensor 10 may comprise six standoffs 18. In other embodiments, the standoffs 18 may be replaced by an electrical cable or other suitable means to electrically couple the half bridges to the main PCB 16.

The fluid 32 may exert a force F on the diaphragm 22 which may correspond to the pressure of the fluid 32. The diaphragm 22 may deform due to this force F, and the amount of deformation may correspond to the pressure of the fluid 32. The amount of deformation of the diaphragm 22 may depend on a number of factors such as the type of material, size, shape, and thickness of the diaphragm 22. The deformation of the diaphragm 22 is typically not permanent; that is, the diaphragm 22 may normally operate under elastic deformation, and the diaphragm 22 may return to its original shape when the force F is removed. If the pressure of the fluid 32 is too high, the force F may cause a permanent deformation of the diaphragm 22, which typically occurs when the pressure far exceeds the rating of the pressure sensor 10.

Figure 2:
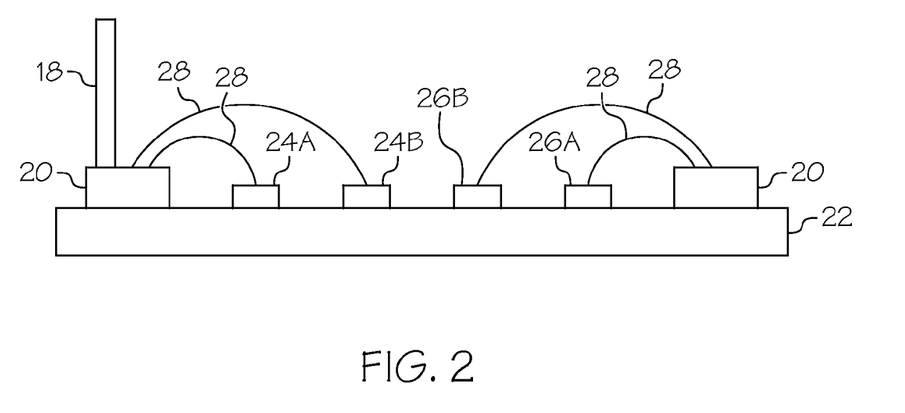
FIG. 2 illustrates a side view of a diaphragm and two half bridges according to one or more embodiments shown and described herein.

Turning to FIG. 2, a side view of the diaphragm 22 and half bridges 24, 26 are shown in more detail. The RSPEs 24A, 24B, 26A, 26B of each half bridge 24, 26 may be mechanically coupled to the diaphragm 22 such that, the deformation of the diaphragm 22 may cause a change in the electrical resistance of one or more of the RSPEs 24A, 24B, 26A, 26B. Since the RSPEs 24A, 24B, 26A, 26B may be mechanically coupled to the diaphragm 22, the deformation of the diaphragm 22 may induce stress in one or more of the RSPEs 24A, 24B, 26A, 26B. This stress, in turn, may cause the resistance value of the RSPEs 24A, 24B, 26A, 26B to change. In this fashion, the pressure of the fluid may cause the resistance value of the RSPE 24A, 24B, 26A, 26B to change. In other words, the resistance value of the RSPEs 24A, 24B, 26A, 26B may correspond to the pressure of the fluid.

It is to be understood that the half bridges 24, 26 (and their associated RSPEs 24A, 24B, 26A, 26B) may be mechanically coupled to the fluid by other techniques as well. For example, the half bridges 24, 26 may be mechanically coupled to the fluid through a rigid push rod or through an intermediate fluid. For the latter technique, the pressure of the fluid may be transmitted to an intermediate fluid (e.g., mercury, hydraulic oil, mineral oil) which, in turn, may be transmitted to the diaphragm 22 to which the half bridges 24, 26 may be mechanically coupled. This technique may be used when the temperature of the fluid is relatively high (e.g., 300 degrees F. or higher), and it is desired to dispose the half bridges 24, 26 and the associated electronics in a location that is cooler than the fluid. Other methods of mechanically coupling the half bridges 24, 25 to the fluid may also be used.

Each of the half bridges 24, 26 may comprise two resistive pressure sensing elements (RPSEs) 24A, 24B, 26A, 26B. Half bridge 24 may comprise a first RPSE 24A and a second RPSE 24B. Likewise, half bridge 26 may comprise a first RPSE 26A and a second RPSE 26B. In one embodiment, the resistance of the first RPSE 24A, 26A may increase when the pressure of the fluid increases, and the resistance of the second RPSE 24B, 26B may decrease when the pressure of the fluid increases. Of course, in an alternative embodiment, the resistance of the first RPSE 24A, 26A may decrease when the pressure of the fluid increases, and the resistance of the second RPSE 24B, 26B may increase when the pressure of the fluid increases.

The RPSEs 24A, 24B, 26A, 26B may be electrically coupled to the diaphragm PCB 20 via bonding wires 28. There may be two bonding wires 28 for each RPSE, and these bonding wires 28 may be electrically coupled to the standoffs 18, typically via the diaphragm PCB 20. In one embodiment, there may be one standoff 18 for each bonding wire 28. In other embodiments, one or more of the bonding wires 28 may be electrically coupled on the diaphragm PCB 20 such that the number of standoffs 18 is less than the number of bonding wires 28. The bonding wires 28 may be made of gold, aluminum, copper, or any other suitable material. The bonding wires 28 may be welded, soldered, or attached by any other suitable means to the diaphragm PCB 20 and to the RPSEs 24A, 24B, 26A, 26B. The diaphragm PCB 20 may be glued or otherwise affixed to the diaphragm 22.

Figure 3A:
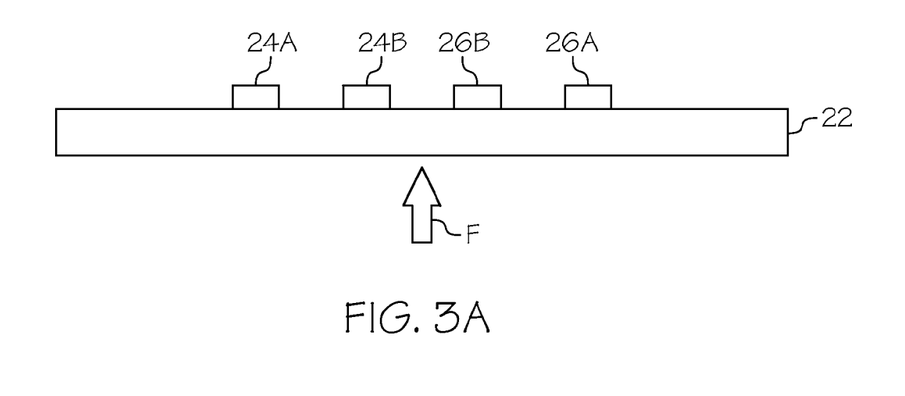
FIGS. 3A and 3B show fluid pressure acting on a diaphragm according to one or more embodiments shown and described herein.
Figure 3B:
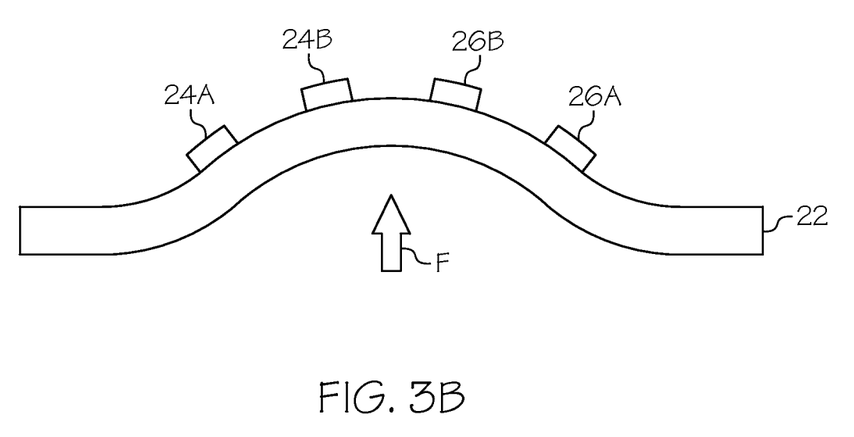

The RPSEs 24A, 24B, 26A, 26B may comprise a piezoresistive material. The resistance of a piezoresistive material may change when a stress is introduced to it. Thus, a pressure applied to the diaphragm 22 may cause it to deform which in turn causes a mechanical stress on the RSPEs 24A, 24B, 26A, 26B which may be mechanically coupled to the diaphragm 22. In this fashion, the resistance of the RPSEs 24A, 24B, 26A, 26B may change when the pressure exerted by the fluid on the diaphragm 22 changes. This phenomenon is shown in FIGS. 3A and 3B. In FIG. 3A, little or no force F is exerted by the fluid on the diaphragm 22, and the diaphragm assumes its relaxed state. Note that, although the diaphragm 22 is shown in FIG. 3A as being relatively flat in its relaxed state, in other embodiments, the relaxed state of the diaphragm 22 may be convex, concave, or any other suitable shape. In FIG. 3B, a larger force F is exerted by the fluid on the diaphragm 22 due to a higher pressure of the fluid, and the diaphragm 22 deforms. The amount of deformation of the diaphragm 22 in FIG. 3B may be exaggerated in order to demonstrate this phenomenon. The actual amount of deformation may be different.

As shown in FIG. 3B, the RPSEs 24A, 24B, 26A, 26B, which are mechanically coupled to the diaphragm 22 may be affected by the deformation of the diaphragm 22 such that the resistance of the RPSEs 24A, 24B, 26A, 26B change when the pressure exerted by the fluid changes. For the left-most half bridge 24, RPSE 24A may experience a contracting force, while RPSE 24B may experience a stretching force. Likewise, for the right-most half bridge 26, RPSE 26A may experience a contracting force, while RPSE 26B may experience a stretching force. These forces may introduce a stress in the RPSEs 24A, 24B, 26A, 26B which may cause their resistance to change. In one embodiment, the contracting force may cause the resistance of the RPSE to decrease, while the stretching force may cause the resistance of the RPSE to increase. In other embodiments, the opposite may occur. In either case, the resistance of the RPSEs 24A, 24B, 26A, 26B may correspond to the force F exerted by the fluid on the diaphragm 22. This change in resistance may be measured and may be used to determine the pressure of the fluid since the force F may be proportional the pressure of the fluid.

Figure 4:
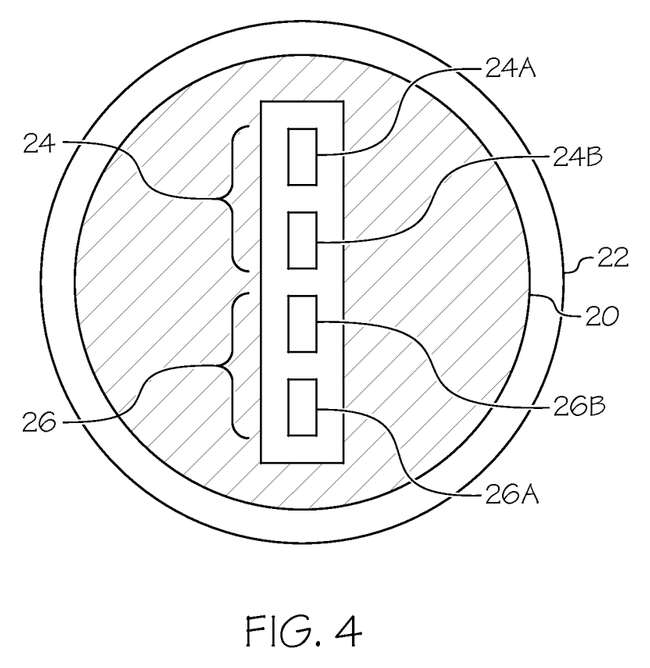
FIG. 4 depicts a top view of a diaphragm and two half bridges according to one or more embodiments shown and described herein.

FIG. 4 illustrates a top view of the diaphragm 22 and half bridges 24, 26. In this embodiment, the diaphragm 22 is round, and the half bridges 24, 26 are mechanically coupled to the diaphragm 22 in a linear fashion. That is, the RPSEs 24A, 24B, 26A, 26B are disposed on the diaphragm 22 in a line. It is contemplated that the RSPEs 24A, 24B, 26A, 26B may be disposed on the diaphragm 22 in any suitable manner. The diaphragm PCB 20 is shown as being primarily round with a cutout in the middle for the RPSEs 24A, 24B, 26A, 26B. It is also contemplated that the diaphragm PCB 20 may comprise any other suitable shape and size. In FIG. 4, the bonding wires, standoffs, and other components are omitted for clarity.

Figure 5:
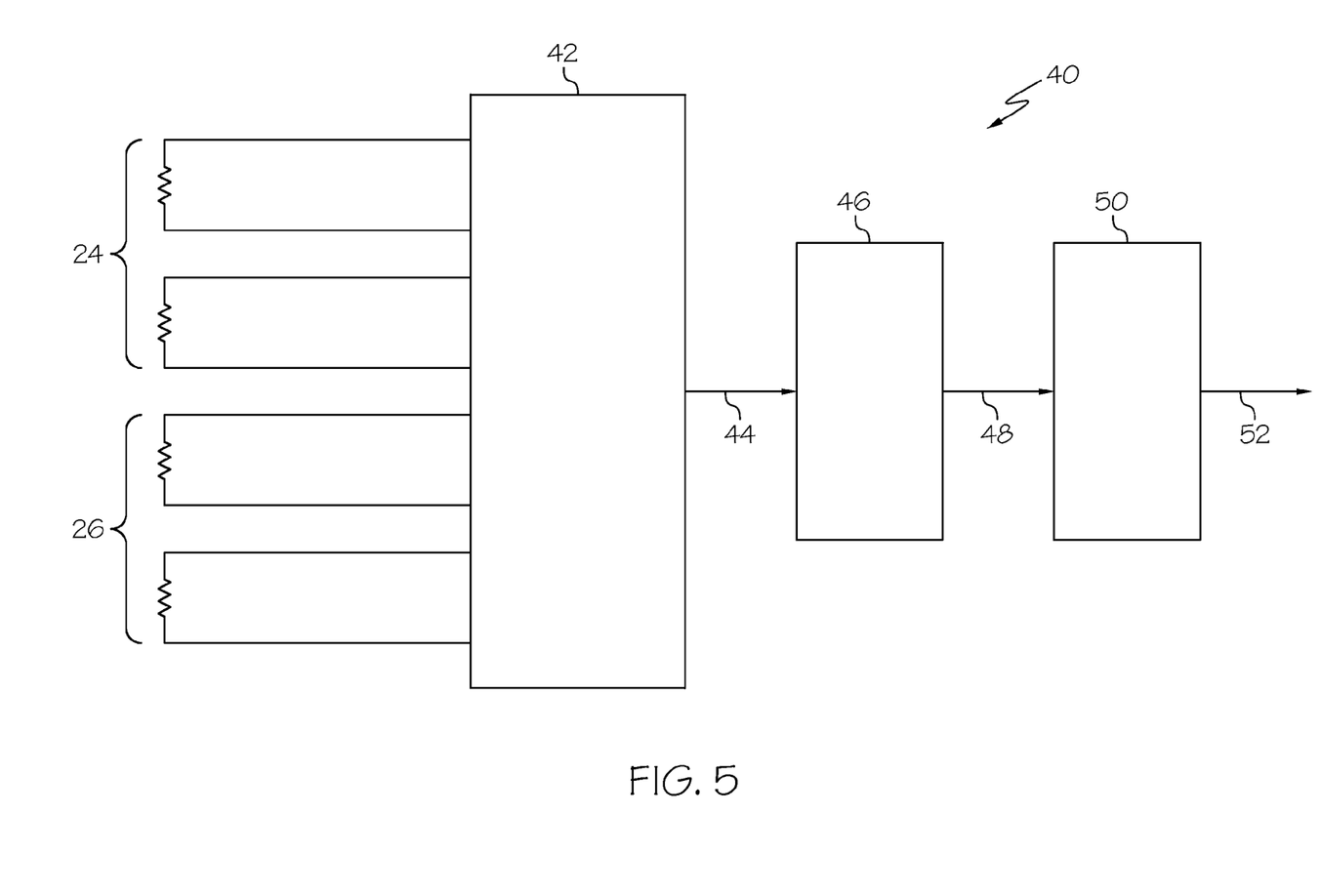
FIGS. 5 and 6 depict electrical schematics of a pressure sensor according to one or more embodiments shown and described herein.

FIG. 5 depicts a schematic of a pressure sensor 40 according to one or more embodiments shown and described herein. The pressure sensor 40 comprises two half bridges 24, 26, an analog-to-digital converter 42, a microcontroller 46, and an output generator 50. The two half bridges 24, 26, which may be mechanically coupled to the diaphragm as previously discussed, may be electrically coupled to the analog-to-digital converter 42. Although only two half bridges 24, 26 are shown, it is contemplated that the pressure sensor 40 may comprise two or more half bridges. The half bridges 24, 26 may be disposed on the diaphragm as previously discussed, while the analog-to-digital converter 42, microcontroller 46, and output generator 50 may be disposed on the main PCB. The half bridges 24, 26 may be electrically coupled to the analog-to-digital converter 42 via bonding wires, the diaphragm PCB, and the standoffs, as previously shown. Other methods of electrically coupling the half bridges 24, 26 to the analog-to-digital converter 42 may be employed as well.

The analog-to-digital converter 42 may be operable to measure the resistance of the first and second RPSEs of the two or more half bridges such that the analog-to-digital converter 42 is operable to produce a first digital number 44 corresponding to the pressure of the fluid based on the measured resistance of the first and second RPSEs of at least one of the two or more half bridges. The analog-to-digital converter 42 may comprise any suitable type of converter, including but not limited to delta-sigma converters, successive approximation converters, and time-to-digital converters. In one embodiment, the analog-to-digital converter 42 may comprise a time-to-digital converter, such as one available from Acam, GmbH., located in Stutensee-Blankenloch, Germany (website: www.acam.de). For example, the analog-to-digital converter 42 may comprise the PS09 time-to-digital converter (called strain gage amplifier by Acam, GmbH.) Other suitable types of analog-to-digital converters may be used as well.

The analog-to-digital converter 42 may measure the resistance of the RPSEs of the two or more half bridges 24, 26, and produce a first digital number 44 corresponding to said resistance. The first digital number 44 may comprise a separate measurement for each individual RPSE, it may comprise a combined measurement of the two RPSEs of each half bridge, or it may combine measurement of all half bridges into a single measurement. Furthermore, the first digital number 44 may comprise a ratio of the resistance values of the two RSPEs of each half bridge. In addition, the first digital number 44 may also comprise a status register which may indicate whether the resistance of each RPSE is within a particular range, such as for example, a working range within which valid resistance measurements are expected. If the resistance measurement falls outside this working range, the corresponding RPSE may be considered to have malfunctioned.

The microcontroller 46 may comprise a 4-bit, 8-bit, 16-bit, 32-bit microprocessor, or any microprocessor of suitable data width. In one embodiment, the microcontroller 46 may comprise the 16-bit PIC24F16KA101 microcontroller from Microchip Technology of Chandler, Ariz. The microcontroller 46 may comprise RAM (random access memory), EEPROM (electrically erasable programmable read-only memory), flash memory, timers, and other peripherals. A computer program, comprising instructions which operate the pressure sensor 40, may be disposed in the flash memory of the microcontroller 46. The microcontroller 46 may be operable to read the first digital number 44 from the analog-to-digital converter 42, and it may be operable to use the first digital number 44 to generate a second digital number 48 which corresponds to the pressure of the fluid.

The computer program of the microcontroller 46 may employ a look-up-table (hereinafter "LUT") to calculate the second digital number 48. The LUT may be physically stored in the flash memory or EEPROM memory of the microcontroller 46. The LUT may also be stored in external memory (not shown). The LUT may store the values of the first digital number 44 for one or more specific pressure values of the fluid. Such a LUT may be established during a calibration process in which the first digital number 44 is observed for various pressure and/or temperature ranges, and subsequently stored in the LUT. In this fashion, the microcontroller 46 may use the LUT to determine a second digital number 48 which corresponds to the pressure of the fluid. Other similar methods may be used as well to determine the pressure of the fluid, as is known in the art. In one embodiment, a separate LUT may be established for each of the two or more half bridges of the pressure sensor 40. Thus, if any of the half bridges malfunction, the LUT of the remaining half bridges may be used to determine the pressure of the fluid. If there are no malfunctions, the results of the LUT for each half bridge may be combined to increase resolution of the pressure measurement.

The microcontroller 46 may be coupled to the output generator 50 such that the microcontroller 46 is operable to write the second digital number 48 to the output generator 50. The output generator 50 may be operable to receive the second digital number 48 from the microcontroller 46 and produce an electrical output signal 52 based on the second digital number 48 such that the electrical output signal 52 corresponds to the pressure of the fluid. The output generator 50 may comprise a digital-to-analog converter which is operable to generate an electrical output signal 52 comprising an analog voltage of, for example, about zero Volts to about 10 Volts corresponding to the pressure of the fluid. Alternatively, the output generator 50 may be operable to generate an electrical output signal 52 comprising analog current of, for example, about 4 mA to about 20 mA corresponding to the pressure of the fluid. In these embodiments, the output generator 50 may comprise an LTC2601 16-bit digital-to-analog converter chip from Linear Technology, Inc. (Milpitas, Calif.). In yet another embodiment, the output generator 50 may be operable to generate an electrical output signal 52 comprising a digital voltage corresponding to the pressure of the fluid. The digital voltage may have two states such as zero Volts and 24 Volts. As an example, the electrical output signal 52 may be about zero Volts when the pressure of the fluid is below a certain threshold, and the electrical output signal 52 may be about 24 Volts when the pressure of the fluid is above a certain threshold. Other types and ranges of voltage and current outputs are contemplated.

The output generator 50 may also comprise a bus interface circuit, which permits the output generator to transmit an electrical output signal over a specific type of bus. For example, the bus interface circuit may comprise a CANopen circuit, which permits the output generator to transmit an electrical output signal 52 over the CANopen bus. Other types of bus interface circuits may be uses as well, including Ethernet and HART protocol. The bus may have two or more signals which permit the output generator 50 to transmit an electrical output signal via the bus to a receiving device. In addition, the output generator 50 may be capable of receiving messages and/or signals from another device via the bus. For example, the output generator 50 may receive commands via the bus which may set operating parameters in the pressure sensor 40.

If the pressure sensor 40 is a "wireless" sensor, the output generator 50 may produce an electrical output signal 52 which comprises a wireless electromagnetic signal which may conform to any suitable wireless standards such as, for example, Bluetooth, wirelessHART, Zigbee, and Wi-Fi (IEEE 802.11). In such embodiments, the output generator 50 may comprise a wireless transmitter and an antenna (not shown) in order to facilitate the transmission of the electrical output signal 52 to the wireless receiver. In addition to transmitting the electrical output signal 52, the output generator 50 may receive commands via the wireless protocol which may set operating parameters in the pressure sensor 40.

Figure 6:
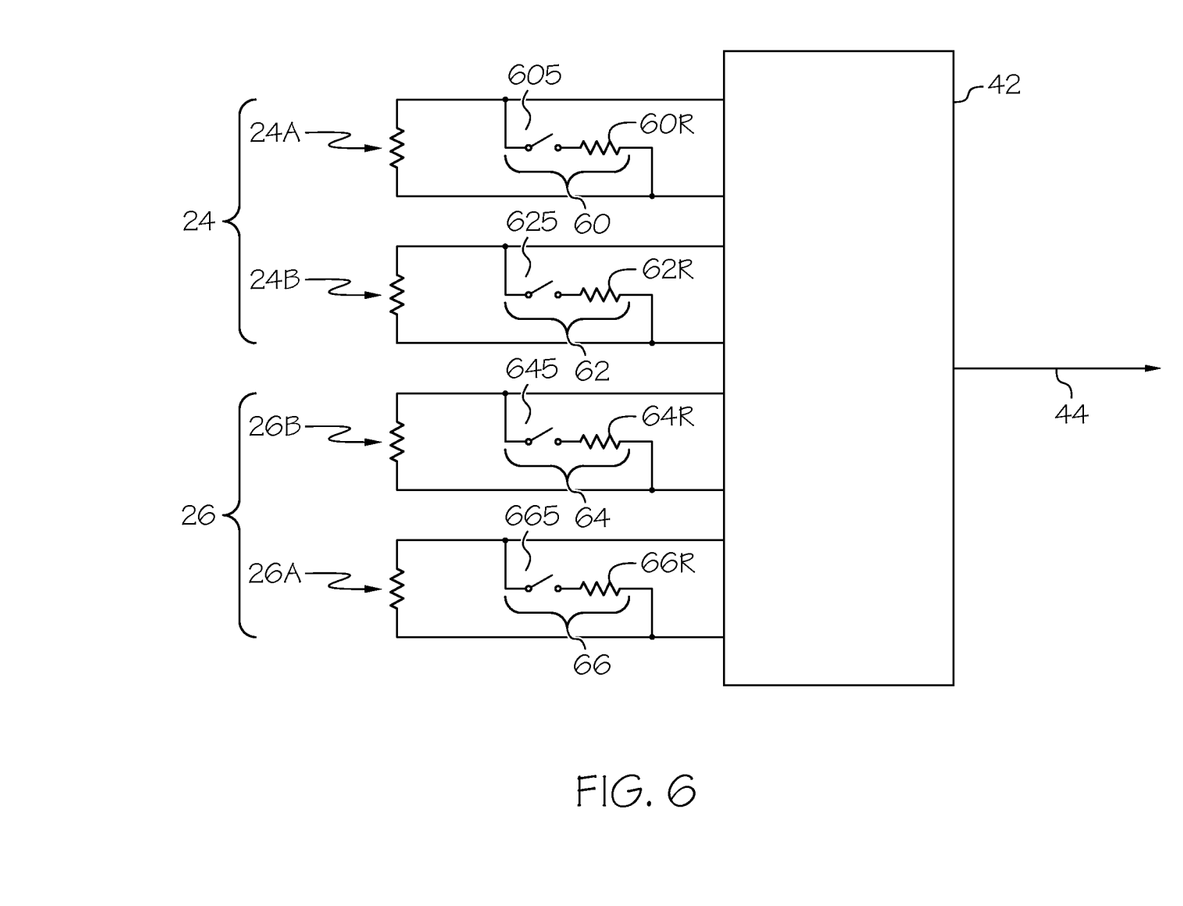

Turning now to FIG. 6, one or more embodiments of the pressure sensor shown and described herein may also comprise one or more redundancy circuits 60, 62, 64, 66. Each redundancy circuit 60, 62, 64, 66 may comprise a switch 60S, 62S, 64S, 66S and a resistor 60R, 62R, 64R, 66R. The switch 60S, 62S, 64S, 66S and resistor 60R, 62R, 64R, 66R may be connected electrically in series, and the combination may be electrically in parallel with the one or more RPSEs 24A, 24B, 26A, 26B. The switch 60S, 62S, 64S, 66S may be electrically coupled to the microcontroller and may comprise an open position and a closed position such that the microcontroller determines whether the switch 60S, 62S, 64S, 66S is in the open position or the closed position. When the switch 60S, 62S, 64S, 66S is in the open position, the resistor 60R, 62R, 64R, 66R has little or no effect on the resistance of the one or more first RPSEs 24A, 26A or the one or more second RPSEs 24B, 26B with which the redundancy circuit 60, 62, 64, 66 is electrically in parallel; and when the switch 60S, 62S, 64S, 66S is in the closed position, the resistor 60R, 62R, 64R, 66R is electrically in parallel with the one or more first RPSEs 24A, 26A or the one or more second RPSEs 24B, 26B with which the redundancy circuit 60, 62, 64, 66 is electrically in parallel.

The switch 60S, 62S, 64S, 66S may be a mechanical relay, a bipolar junction transistor, a field-effect transistor, or any other suitable switch. In one embodiment, a general purpose input/output pin of the analog-to-digital converter 42 may be used. For example, the PS09 time-to-digital converter chip from Acam GmbH has eight general purpose input/output pins which may be independently enabled or disabled by the microcontroller. In this embodiment, the input/output pin functions as the switch 60S, 62S, 64S, 66S. When the input/output pin is placed in the high-impedance state, the switch 60S, 62S, 64S, 66S is effectively in the open position. When the input/output pin is placed in the output state with an output of "0," the switch 60S, 62S, 64S, 66S is effectively in the closed position. The reason is that the side of the RPSE to which the switch 60S, 62S, 64S, 66S is electrically coupled may be connected to ground.

The resistor 60R, 62R, 64R, 66R may comprise a fixed resistor having a similar value as the corresponding RPSE. For example, if the RPSE has a value of 4000 Ohms to 6000 Ohms, the resistor 60R, 62R, 64R, 66R may have a value of approximately 5000 Ohms. In this fashion, when the resistor 60R, 62R, 64R, 66R replaces the malfunctioned RPSE, the analog-to-digital converter 42 may observe a value of resistance that is comparable to the malfunctioned RPSE and may, therefore, continue to operate normally.

The redundancy circuit 60, 62, 64, 66 may simply give the microcontroller the capability of inserting a resistor 60R, 62R, 64R, 66R in parallel with one or more of the RPSEs 24A, 24B, 26A, 26B. Such a capability may be useful when one or more of the RPSEs 24A, 24B, 26A, 26B malfunctions. This may occur when the pressure sensor is subjected to one or more operating conditions above which the pressure sensor was designed. For example, excessive temperature, pressure, and/or shock may cause one of the RPSEs to malfunction. Additionally, manufacturing defects may cause the RPSE to malfunction even when the pressure sensor is operated within its designed operating ranges. In many cases of malfunction, the RPSE may "open" (i.e., has a very high resistance value). In such cases, a malfunctioned RPSE may cause the analog-to-digital converter 42 to stop working properly such that it is not able to produce a valid first digital number corresponding to the pressure of the fluid. In cases of a malfunctioned RPSE, the redundancy circuit 60, 62, 64, 66 may permit one or more resistors 60R, 62R, 64R, 66R to take the place of the malfunctioned RPSE such that the analog-to-digital converter 42 may operate normally.

For example, in FIG. 6 if RPSE 24A were to malfunction and open, the analog-to-digital converter 42 may not be able operate properly and may not be capable of reading the remaining RPSEs 24B, 26A, 26B. In such a case, the microcontroller may set switch 60S to the closed position so that resistor 60R is electrically in parallel with the malfunctioned RPSE 24A. This may allow the analog-to-digital converter 42 to continue to operate normally and to read the resistance of RPSEs 26A, 26B of half bridge 26 accurately. This may permit the pressure sensor to continue to function normally, even though one of its two half bridges 24, 26 has malfunctioned. Under such conditions, the half bridge 24 may no longer measure pressure accurately. As such, the microcontroller may ignore the data from half bridge 24 and may only determine the pressure of the fluid based on the remaining half bridge 26 which hasn't malfunctioned.

In order to recognize when one of the RPSEs has malfunctioned, the microcontroller and/or analog-to-digital converter 42 may establish a resistance range. Such a resistance range may apply to an individual RPSE, each half bridge, or the combined resistance of all half bridges. When the measured resistance falls within the resistance range, the microcontroller assumes that no malfunction has occurred. Conversely, when the measured resistance falls outside the resistance range, the microcontroller assumes that one or more of the RPSEs has malfunctioned. In such cases, the microcontroller may be capable of determining which RPSE has malfunctioned, based on the measured resistance values. Alternatively, the microcontroller may set each switch 60S, 62S, 64S, 66S to the closed position one at a time in order to observe whether the malfunction has been removed. The microcontroller may apply filtering to this range calculation so that, if the measured resistance falls outside the range for only one or two sample times (e.g., due to electrical noise, shock, or vibration), it will not cause the microcontroller to immediate assume that a particular RSPE has failed.

In one embodiment, when a malfunction occurs, the analog-to-digital converter 42 may produce resistance measurements which do not change. That is, the resistance measurements become frozen and are exactly the same when read by the microcontroller. Thus, the microcontroller may determine that an RPSE has malfunction based on the unchanging (or "frozen") measurements from the analog-to-digital converter. In this embodiment, it may only be possible to determine which RPSE has malfunctioned by setting each switch 60R, 62R, 64R, 66R to the closed position in sequence and determining which switch activation causes the measurement become unfrozen.

Once it is determined that an RSPE has malfunctioned, the microcontroller may set its corresponding switch to the closed position in order to permit the analog-to-digital converter to continue operating normally. In such cases, the microcontroller may use the measurement data from the half bridge which has no malfunctioning RPSE in order to calculate the pressure of the fluid.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A pressure sensor for measuring the pressure of a fluid, the pressure sensor comprising two or more half bridges, an analog-to-digital converter, a microcontroller, an output generator, and one or more redundancy circuits, wherein:
the two or more half bridges are mechanically coupled to the fluid;
each of the two or more half bridges comprises a first resistive pressure sensing element (RPSE) and a second RPSE, such that the resistance of the first RPSE increases when the pressure of the fluid increases, and the resistance of the second RPSE decreases when the pressure of the fluid increases;
the analog-to-digital converter is electrically coupled to the two or more half bridges and is operable to measure the resistance of the first and second RPSEs of the two or more half bridges such that the analog-to-digital converter is operable to produce a first digital number corresponding to the pressure of the fluid based on the measured resistance of the first and second RPSEs of at least one of the two or more half bridges;
the microcontroller is electrically coupled to the analog-to-digital converter and the output generator, such that the microcontroller is operable to read the first digital number from the analog-to-digital converter, generate a second digital number corresponding to the pressure of the fluid, and write the second digital number to the output generator;
the output generator is operable to receive the second digital number from the microcontroller and produce an electrical output signal based on the second digital number such that the electrical output signal corresponds to the pressure of the fluid; and
the one or more redundancy circuits are electrically coupled to the one or more of the first RPSEs or one or more of the second RPSEs of the two or more half bridges, and the redundancy circuit comprises a resistor and a switch in series, wherein:
the switch is electrically coupled to the microcontroller and comprises an open position and a closed position such that the microcontroller determines whether the switch is in the open position or the closed position; and
when the switch is in the open position, the resistor has little or no effect on the resistance of the one or more first RPSEs or the one or more second RPSEs with which the redundancy circuit is electrically in parallel; and when the switch is in the closed position, the resistor is electrically in parallel with the one or more first RPSEs or the one or more second RPSEs with which the redundancy circuit is electrically in parallel.

2. The pressure sensor of claim 1 comprising two half bridges.

3. The pressure sensor of claim 2 comprising two redundancy circuits electrically in parallel with the first RPSE and the second RPSE of one of the two half bridges.

4. The pressure sensor of claim 1, wherein the analog-to-digital converter comprises a time-to-digital converter operable to measure the resistance or the ratio of the resistance of the first and/or second RPSEs of the two or more half bridges by measuring a voltage discharge time of a capacitor charged to a substantially fixed voltage through the first and/or second RPSEs.

5. The pressure sensor of claim 4, wherein the analog-to-digital converter comprises a PS09 time-to-digital converter.

6. The pressure sensor of claim 1, wherein the first and second RPSEs of the two or more half bridges comprise piezoresitive devices.

7. The pressure sensor of claim 1, wherein the output generator comprises a digital-to-analog converter operable to produce the electrical output signal comprising an analog voltage or an analog current.

8. The pressure sensor of claim 7, wherein the electrical output signal comprises an analog voltage of approximately 0 to 10 Volts corresponding to the pressure of the fluid.

9. The pressure sensor of claim 7, wherein the electrical output signal comprises an analog current of approximately 4 mA to 20 mA corresponding to the pressure of the fluid.

10. The pressure sensor of claim 1, wherein the output generator comprises a digital switch operable to produce the electrical output signal comprising a digital voltage corresponding to the pressure of the fluid.

11. A method for operating a pressure sensor for measuring the pressure of a fluid, wherein the pressure sensor comprises two or more half bridges, an analog-to-digital converter, a microcontroller, an output generator, and one or more redundancy circuits, wherein:
the two or more half bridges are mechanically coupled to the fluid;
each of the two or more half bridges comprises a first resistive pressure sensing element (RPSE) and a second RPSE, such that the resistance of the first RPSE increases when the pressure of the fluid increases, and the resistance of the second RPSE decreases when the pressure of the fluid increases;

the analog-to-digital converter is electrically coupled to the two or more half bridges and is operable to measure the resistance of the first and second RPSEs of the two or more half bridges such that the analog-to-digital converter is operable to produce a first digital number corresponding to the pressure of the fluid based on the measured resistance of the first and second RPSEs of at least one of the two or more half bridges;

the microcontroller is electrically coupled to the analog-to-digital converter and the output generator, such that the microcontroller is operable to read the first digital number from the analog-to-digital converter, generate a second digital number corresponding to the pressure of the fluid, and write the second digital number to the output generator;

the output generator is operable to receive the second digital number from the microcontroller and produce an electrical output signal based on the second digital number such that the electrical output signal corresponds to the pressure of the fluid; and the one or more redundancy circuits are electrically coupled to the one or more of the first RPSEs or one or more of the second RPSEs of the two or more half bridges, and the redundancy circuit comprises a resistor and a switch in series, wherein:

the switch is electrically coupled to the microcontroller and comprises an open position and a closed position such that the microcontroller determines whether the switch is in the open position or the closed position; and when the switch is in the open position, the resistor has little or no effect on the resistance of the one or more first RPSEs or the one or more second RPSEs with which the redundancy circuit is electrically in parallel; and when the switch is in the closed position, the resistor is electrically in parallel with the one or more first RPSEs or the one or more second RPSEs with which the redundancy circuit is electrically in parallel, and the method comprises:

determining that one or more of the first or second RPSEs has malfunctioned;

setting to the closed position the switch of the redundancy circuit electrically in parallel with the malfunctioned first or second RPSE; and basing the measured pressure on the resistance of the one or more half bridges which do not have a malfunctioned first or second RPSE.

12. The method of claim 11, wherein the pressure sensor comprises two half bridges.

13. The method of claim 12, wherein the pressure sensor comprises two redundancy circuits electrically in parallel with the first RPSE and the second RPSE of one of the two half bridges.

14. The method of claim 11, wherein the analog-to-digital converter comprises a time-to-digital converter operable to measure the resistance or the ratio of the resistance of the first and/or second RPSEs of the two or more half bridges by measuring a voltage discharge time of a capacitor charged to a substantially fixed voltage through the first and/or second RPSEs.

15. The method of claim 14, wherein the analog-to-digital converter comprises a PS09 time-to-digital converter.

16. The method of claim 11, wherein the first and second RPSEs of the two or more half bridges comprise piezoresitive devices.

17. The method of claim 11, wherein the output generator comprises a digital-to-analog converter operable to produce the electrical output signal comprising an analog voltage or an analog current.

18. The method of claim 17, wherein the electrical output signal comprises an analog voltage of approximately 0 to 10 Volts corresponding to the pressure of the fluid.

19. The method sensor of claim 17, wherein the electrical output signal comprises an analog current of approximately 4 mA to 20 mA corresponding to the pressure of the fluid.

20. The method sensor of claim 11, wherein the output generator comprises a digital switch operable to produce the electrical output signal comprising a digital voltage corresponding to the pressure of the fluid.

\* \* \* \* \*